United States Patent [19]

Kowalski et al.

[11] Patent Number: 5,534,686
[45] Date of Patent: Jul. 9, 1996

[54] TWIN-CONTACT CHIP CARD AND METHOD OF COMMUNICATION WITH A CARD READER

[75] Inventors: Jacek Kowalski, Trets; Jean Sureaud, Le Beausset, both of France

[73] Assignee: Gemplus Card International, Gemenos, France

[21] Appl. No.: 256,821
[22] PCT Filed: Jan. 26, 1993
[86] PCT No.: PCT/FR93/00074
  § 371 Date: Jul. 25, 1994
  § 102(e) Date: Jul. 25, 1994
[87] PCT Pub. No.: WO93/15477
  PCT Pub. Date: Aug. 5, 1993

[30] Foreign Application Priority Data

Jan. 30, 1992 [FR] France ................ 92 01038

[51] Int. Cl.⁶ .................................. G06K 19/067
[52] U.S. Cl. .......................... 235/492; 902/26
[58] Field of Search .................. 235/492, 487; 902/26

[56] References Cited

U.S. PATENT DOCUMENTS 4,272,758  6/1981  Giraud .................. 340/310.02
4,621,190  11/1988 Saito et al. ................ 235/492
4,948,954  8/1990  Dias ..................... 235/492 X

*Primary Examiner*—Donald T. Hajec
*Assistant Examiner*—Jeffrey R. Filipek
*Attorney, Agent, or Firm*—Nilles & Nilles

[57] ABSTRACT

The invention relates to chip cards. There is disclosed a chip card (12) with only two contacts intented both to information exchanges (instructions and data) between the card (12) and a card reader and to the power supply of the card (12). According to the invention, the contacts are preferably a clock contact (CLK) used to the synchronization of data and instructions, and a data input/output contact (I/O) used to the transmission of data and instructions from the reader to the card (12) and to the transmission of data from the card (12) to the reader. For the power supply, a full-wave rectifier (bridge of diodes) may be arranged between the two contacts (CLK;I/O). The invention also relates to the communication protocole which allows to use only two contacts (CLK;I/O) while having instructions similar to those of conventional chip cards (initialization of the card, address incrementation of memory cell, reading of the cell, writing, comparison of a confidential code).

20 Claims, 5 Drawing Sheets

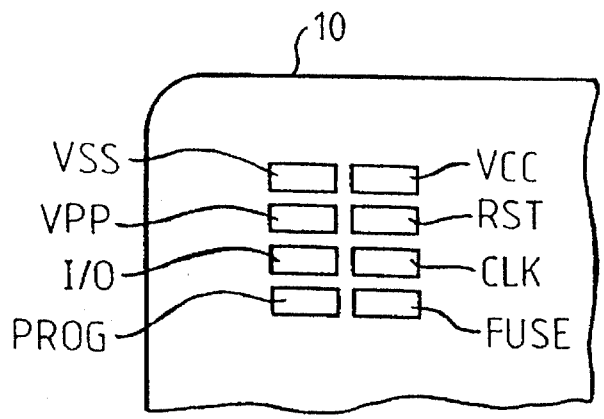
FIG_1
PRIOR ART
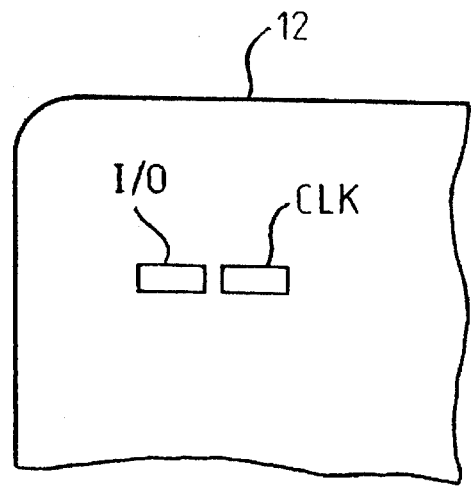
FIG_2
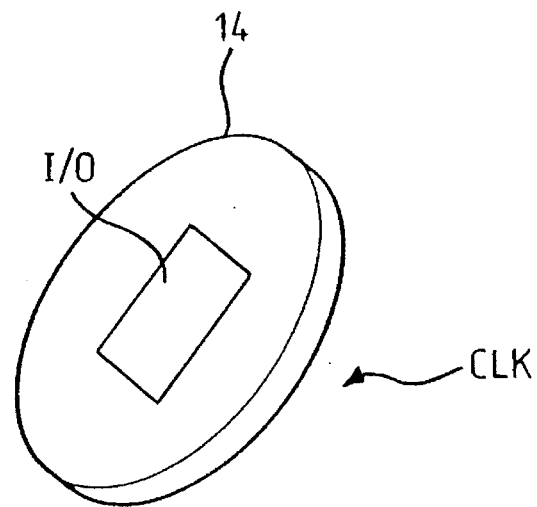
FIG_3

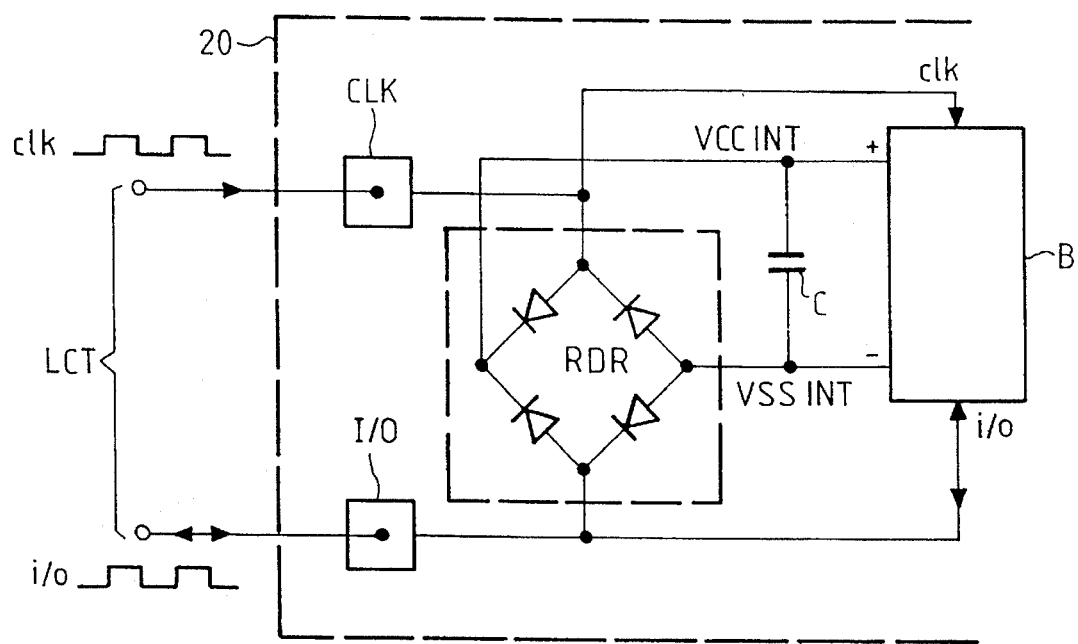
FIG_4
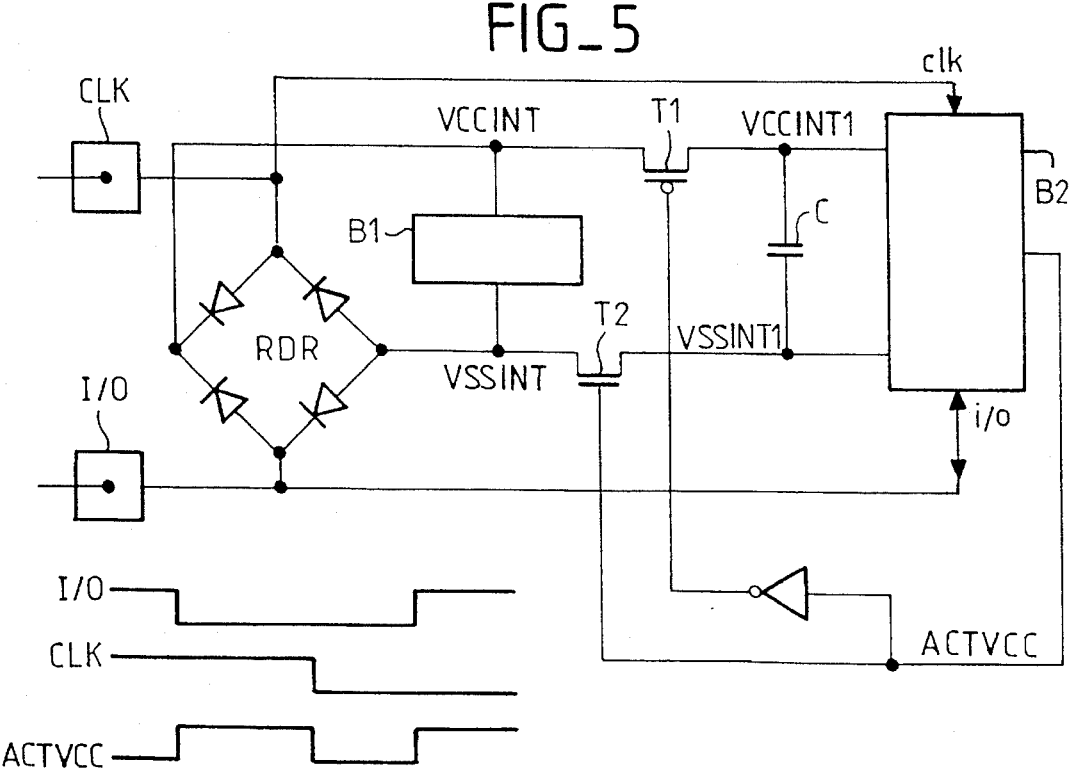
FIG_5

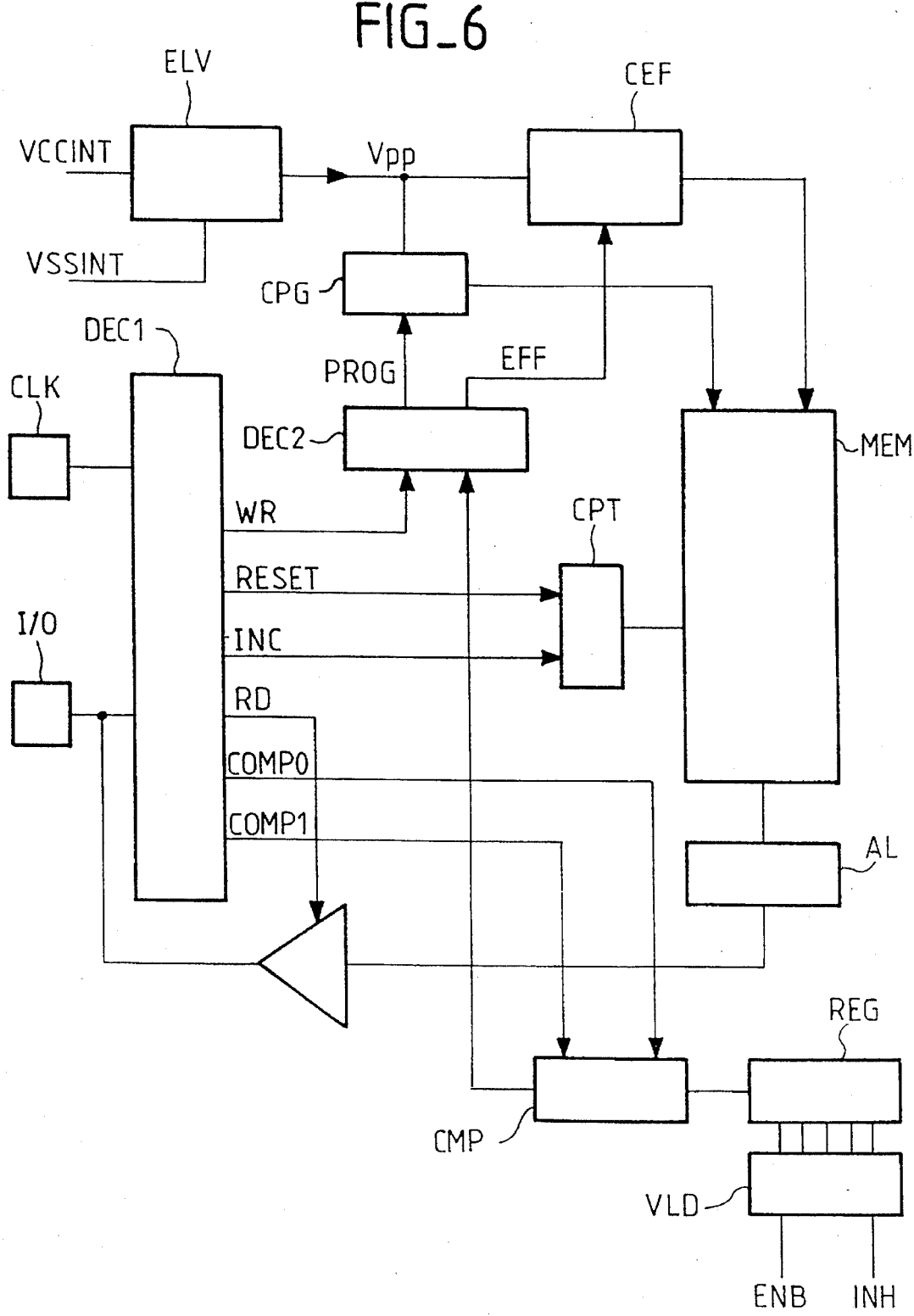
FIG_6

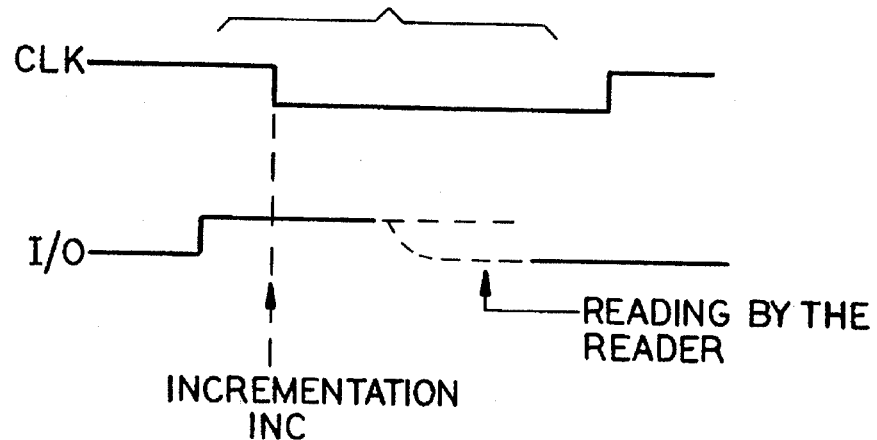
FIG_7
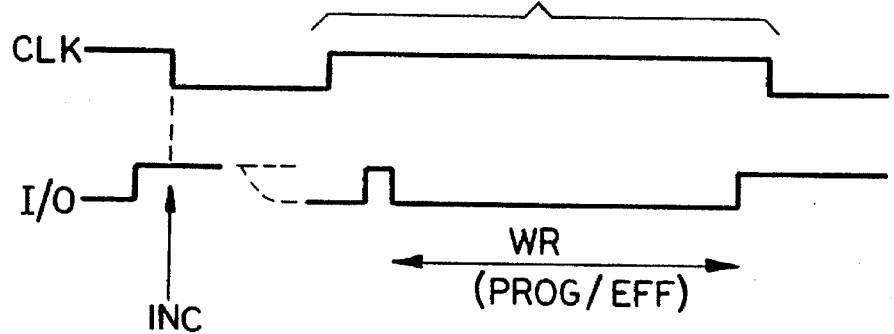
FIG_8
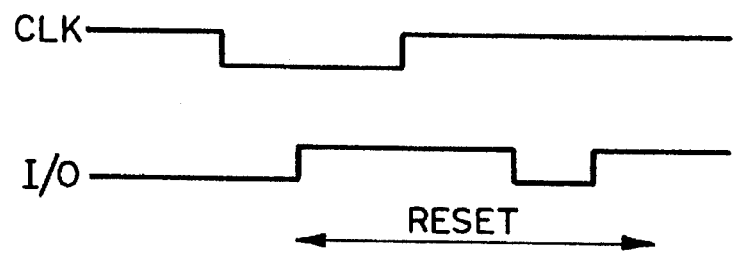
FIG_9

FIG_10
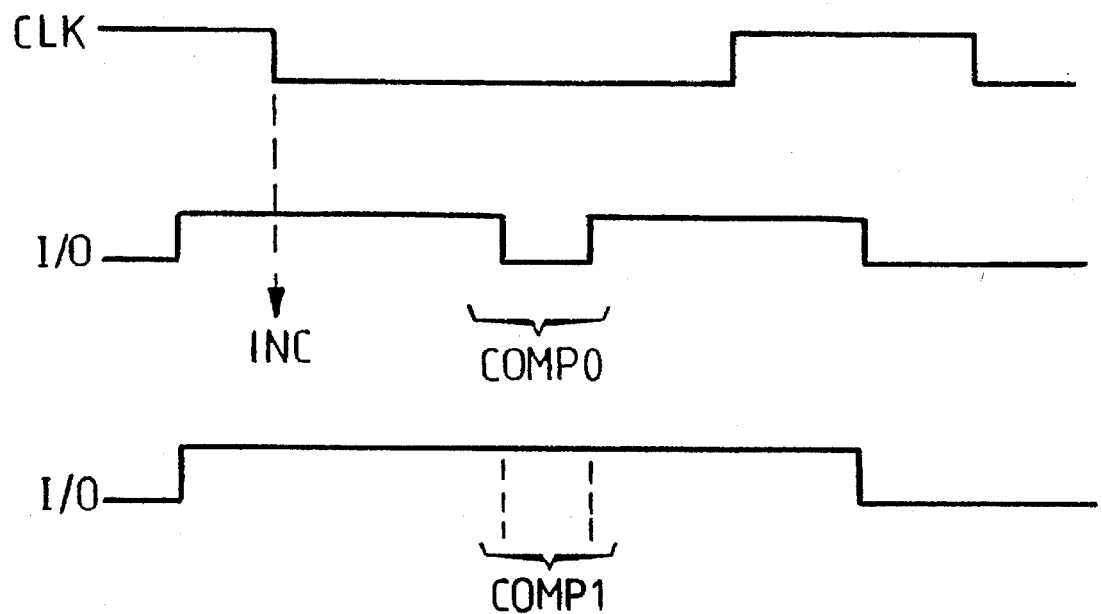
FIG_11
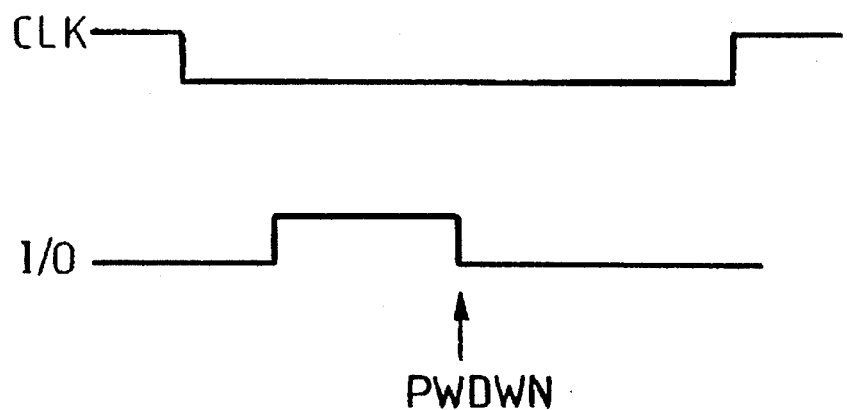

TWIN-CONTACT CHIP CARD AND METHOD OF COMMUNICATION WITH A CARD READER

The invention relates to chip cards such as memory cards or microprocessor-based cards.

These cards are used in a growing number of applications, and an essential factor in their success lies in the possibility of manufacturing them at low cost. For example, for applications to commercial transactions involving small sums of money (for example prepaid phone cards, prepaid parking cards, etc.), it is very important that the cost of manufacture of the card should be low as compared with the commercial value of the services provided by the card.

To manufacture a chip card, a micromodule comprising an integrated circuit chip, a connector with several contacts and connection wires between the chip and the connector are mounted in a plastic carrier (the card itself). The connector of the chip card is constituted by the connector of the micromodule.

It is noted that, in the manufacture of the micromodule, the operations of assembling the chip in the micromodule cost a great deal more than the chip itself. The ratio may go up to 4:1.

To reduce the overall cost of the card, it is therefore advantageous to optimize the operations of assembling the chip in the micromodule, even if this makes the circuits of the chip more complex. The documents WO-A-604 171, EP-A-0 287 175 and FR-A-2 608 293 presents embodiments such as these.

Among the approaches envisaged, there is that of reducing the number of contacts of the connector, and hence of the number of connection wires (which are soldered by the so-called wire-bonding technique) between the chip and the connector. cards have a maximum of eight contacts according to the ISO standard 7816. Often, only five or six of these contacts are actually used.

If there could be a change to having only two contacts, the cost would be considerably reduced. Furthermore, reducing the number of contacts would mean reducing the risk of electrostatic discharges which can damage the chips. A reduction is also obtained in the surface area of the chip (a large portion of which is used solely to place the contact pads which have to receive the connection wires with the connector), the cost of the chip being thereby reduced accordingly. Finally, if only two contacts are used, it is possible to envisage applications of chip cards in formats other than those of credit cards which constitute the most common format of presently used chip cards (these are flat cards of about 5 cm by 8 cm with a thickness of about 1 millimeter). For example, it is possible to envisage chip coins (having a format similar to that of a coin) or chip keys (having a format similar to that of a key). In these formats, it would be particularly advantageous to have only two contacts, in order to eliminate, to the greatest possible extent, the requirements of the accurate positioning of the card in the reader.

However, it is of course not easy to propose a card having only two contacts because it is necessary firstly to supply the card with power and secondly to enable two-way communication between the card and the reader into which it is inserted. For example, the phone cards presently used in France have seven useful contacts that may be called VCC, VSS, VPP, CLK, I/O, RST, FUSE, plus one unused contact (PROG). These contacts correspond respectively to:

VCC: positive supply voltage of 5 volts;
VSS: ground;
VPP: programming voltage (about 21 V);
CLK: clock;
I/O: data output for reading in a memory of the card;
FUSE: contact for general activation and reinitialization; and
RST: this contact defines whether the operation is an incrementation operation (RST=0) or a programming operation (RST=1) on a leading edge of the clock signal CLK.

It will easily be understood that it is not easy to obtain the same functions with two contacts only.

However, attempts have been made to propose cards that work with two contacts only. The proposals made are based essentially on the use of the ground contact VSS and the supply contact VCC with an amplitude modulation of the voltage present at the contact VCC. The permanent presence of a supply voltage gives the supply power of the card. The modulation of this voltage represents the information elements exchanged between the card and the reader. However, these approaches are not satisfactory. Amplitude detection is not easy to master in standard technologies using integrated circuit chips. Furthermore, it is impossible to achieve compatibility with the card readers already in service, and all existing readers would need to be changed if they had to be capable of receiving twin-contact cards. The readers do not have circuits enabling the modulation of the supply voltage and, consequently, it is not possible to devise operational software for these cards that would act by means of this technique.

The present invention is based on a novel approach which is that of the use of the clock contact CLK and of the data input/output contact I/O to carry out almost all the operations normally carried out by a standard chip card including, if need be, the transmission to the card of the power needed for its operations. It will be shown then that it is possible to obtain a chip card having only these two contacts and it will be shown that it is possible to find a communications protocol that enables compatibility with existing readers, which would be impossible with the twin-contact approaches proposed in the prior art.

According to a first aspect, the invention therefore proposes a chip card of the type enabling an exchange of information elements between this card and a reader into which it is inserted, this card comprising at least two contacts used for this exchange, wherein said card further comprises a rectifier circuit having inputs connected to the two contacts and outputs providing the rest of the card with a rectified voltage necessary for its supply.

The rectifier is therefore used to produce a supply voltage for the card on the basis of voltage levels alternating on the two contacts. It is preferably a full-wave rectifier. It may be formed by a four-diode bridge according to a standard assembly in the field of DC voltage supplies obtained from an AC voltage.

The energy of the signals used for the exchange of information is therefore used in an unexpected way to supply the card with DC voltage, in taking advantage of the fact that the signals will often be in different logic states and therefore at different potentials.

The full-wave rectification is of course preferable if it is desired to recover the greatest amount of power possible. The recovery is indeed then got irrespectively of the direction of the voltage present between the contacts. It must be understood that the two contacts receive logic levels from the reader that vary permanently during an exchange of information elements and that the probability of the two contacts remaining at the same potential during an excessively lengthy period is very low. The procedure of communicating information elements (data or instructions) therefore enables the card to be supplied permanently.

It is then possible preferably to make a chip card having only two contacts between which the rectifier is placed.

According to another aspect of the invention, as explained hereabove, a particularly promising choice for making a twin-contact card consists in taking, as a first contact, a clock contact designed for the reception, from the reader, of the logic signals for synchronizing the exchanges and, as a second contact, an input/output contact to receive and give logic signals determining the information elements (data or instructions) exchanged.

Consequently, according to the second aspect of the invention, there is proposed a chip card having only two contacts, this card being characterized by the fact the first contact is a clock contact whose leading and trailing edges determine the instant of each operation to be performed by the card, and a second contact is an input/output contact for data elements whose logic level represents, firstly, the instruction to be carried out by the card under the control of the reader and, secondly, the information from the card intended for the reader.

We shall see how the fact that these two contacts have been chosen instead of a ground contact and a supply contact makes it possible notably to obtain compatibility with existing card readers: the main reason for this is that the known readers are designed to work under the control of software programs whose main task is to define the clock signals (CLK) and the input/output signals (I/O), and other signals too but not the supply voltage. These readers could therefore continue to be used, and it is only the software that would have to be modified. This is not possible with a twin-contact card whose contacts are a ground contact and an amplitude-modulated supply contact.

Of course, the full-wave rectifier mentioned further above could be used if it is desired that the contacts should serve not only for the two-way communication but also for the transmission of the necessary power to the card.

Finally, according to a third aspect, the invention relates to an original communications protocol that makes it possible, with a twin-contact card, to have on the whole the same possibilities of information exchange as with the presently used six-contact or eight-contact cards.

According to this third aspect, the invention proposes a method of communication between a chip card and a card reader by means of a clock contact CLK controlled by the reader and a data input/output contact I/O, a method characterized in that:

a) the writing of an information bit in a memory cell of the card is done immediately after an operation for reading the state of this bit;

b) a write command is given by the reader by means of the contacts CLK and I/O only if the bit read is the logic reverse of the bit to be written, the write command being given in a form that is independent of the value of the bit to be written;

c) when there is a write command received from the reader, the card carries out a programming or erasing operation as a function of the value of the bit read.

Consequently, when an information element has to be written in a memory cell of the card, the reader does not send a command chosen from among two different possible commands (a programming command and an erasing command), but a single write command. The software program of the reader sends a write command only if the state of the bit to be written is not the one that has just been read. And the card interprets the write command received, also as a function of the state of the bit read just before, in order to convert it into either a programming command or an erasing command.

This particular feature makes it possible to set up a complete communications protocol which furthermore includes, as the case may be, instructions other than the read and write instruction, this being achieved with only the above-mentioned two contacts CLK and I/O. Furthermore, this particular feature has the advantage of preventing any over-programming or over-erasure of a memory cell despite the fact that the write command is the one and only command for the erasure and the programming. An over-programming (or an over-erasure) occurs when a programming (or erasure) command is given while the cell is already programmed (or erased). This over-programming was avoided in the prior art with protocols in which the reader could give two different commands.

Preferably, the reading of the state of a bit takes place according to the following protocol, with the different stages occurring in the order given: the setting of the contact I/O by the reader in a first state while CLK is at a first level; first changing of the level of CLK; the release of the potential of the contact I/O by the reader; the setting, by the card, of the contact in a state corresponding to the information element to be transmitted; the reading of the logic state of the contact I/O by the reader before a second change in the level of CLK to its first level.

The reader preferably sets the contact I/O in a second state, after the reading and before the second change in the level of CLK.

The writing can be done preferably according to the following protocol: while CLK is at its first level, after a read operation, a short pulse is given by the reader on the contact I/O, making this contact go to the first state and bringing it back to the second state; the writing is done after this short pulse while the contact I/O remains set in the second state and on condition that CLK remains in the first state.

For a chip card having a memory provided with means for incrementing the position of the cell to be read or written, it is preferably provided that the incrementation command will be constituted by the first part of the read command, namely the passing of CLK to the second level after I/O is set in the first state.

In certain memory cards with a certain degree of security against fraudulent attempts at communication, for example by the use of confidential codes, it may be planned to have two additional commands given by the reader to the card. These are commands for comparing a memory bit of the card with a value indicated by the reader. It shall be seen further below that these commands may be carried out in addition to the foregoing commands, again with the two contacts CLK and I/O. Other commands too may be carried out according to the twin-contact communications protocol which is the object of this invention. These commands are, for example a command for resetting the incrementation counter and a low-power standby command.

Other features and advantages of the invention shall appear from the following detailed description made with reference to the appended drawings, of which:

FIG. 1 shows the contacts of a conventional chip card with eight standardized contacts;

FIG. 2 shows a chip card according to the invention with two contacts only;

FIG. 3 shows a chip card having two contacts, each contact being placed on one face of the element;

FIG. 4 shows an electrical diagram of a part of the chip card according to the invention;

FIG. 5 shows an alternative structure of the diagram of FIG. 4;

FIG. 6 shows a general circuit diagram of a chip card circuit enabling the implementation of the present invention; and FIGS. 7 to 11 show the communications protocol between the card and the reader and, more specifically, FIG. 7 pertains to the reading of an information bit contained in the card, FIG. 8 pertains to the writing, FIG. 9 pertains to the resetting of the address counter of the card, FIG. 10 pertains to the comparison commands for the validation of a confidential code, and FIG. 11 pertains to the placing of the system in a state of standby with low consumption.

FIG. 1 shows a standard chip card 10 such as a card having the format of a credit card with eight contacts flush with the surface. The eight contacts are those mentioned further above with the definitions given: VCC, VSS, VPP, RST, I/O, CLK, FUSE, PROG. The definition of the contacts RST, FUSE and PROG may vary according to the standards used which are not the same in every country. However, the supply contacts VCC, VSS, VPP, the data input/output contact I/O and the clock contact CLK are defined identically in the standardized protocols that are used in practice today.

FIG. 2 shows a card 12 according to a preferred embodiment of the invention. Its particular feature is that it has only two contacts which can be used both for supply and for the exchange of information elements. These contacts are a data input/output contact I/O and a clock contact CLK. The term "data input/output contact" is understood to mean a contact designed, firstly, to receive voltage logic levels representing information elements (data or instructions) given by a card reader when the card is inserted into the reader and, secondly, to give information elements intended for the reader and coming from the card. The term "clock contact" is understood to mean a contact designed to receive alternating voltage logic levels from the reader in order to define instants at which instructions are carried out. The combination, at a given point in time, of the states or transitions of the clock contact and of the states or transitions of the contact I/O will define the different operations of the card.

If the card has only two contacts, it may have the particularly simple shape, known as a chip coin shape, shown in FIG. 3: a chip is embedded in a disk-shaped module 14 having the size of a coin for example. A contact CLK is provided on one face and a contact I/O on the other face. The problems of positioning the card in a reader are greatly simplified as compared with a card having the credit card format.

In the case of a card that keeps the standard format of a credit card (FIG. 2), it is provided preferably that the position of the remaining two contacts, I/O and CLK, will be exactly the same as that of the corresponding contacts I/O and CLK of the eight-contact cards. In this way, the cards could be used in existing readers with only a modification of their operating software.

In order that the card may be capable of working with only two contacts while at the same time receiving power from the reader, preferably, according to the invention, provision is made for the arrangements shown in FIGS. 4 and 5. In these arrangements, the two contacts I/O and CLK, which are information exchange contacts, may also give the power needed for the card.

FIG. 4 shows how this is made possible according to the invention: a rectifier circuit is connected between the two contacts used for the exchange of information elements between the reader and the card. Here, of course, these are contacts I/O and CLK but it is possible to envisage other situations in which information elements are exchanged by means of contacts other than CLK and I/O and in which a rectifier would then be connected between these two contacts to supply the electronic circuits of the card with power.

In FIG. 4, the reference 20 has been used to designate the integrated circuit chip contained in the card, with the information exchange contact pads CLK (clock contact) and I/O (data input/output contact). These contact pads of the chip have been given the same references as the external contacts of the card for they are directly connected to them. These contacts are connected to a card reader LCT which gives them clock signals clk and gives or receives data elements i/o. The signals are alternately high and low logic levels, alternating for example between 5 volts and 0 volts.

The electronic circuits of the card are depicted comprehensively by a block given the general reference B. This block is directly connected to the contacts CLK and I/O to receive the data elements, instructions and clock signals from the reader and to give it data elements.

Furthermore, the block B receives DC supply voltages VCCINT and VSSINT. The former voltage is presumed to be the more positive of the two.

These supply voltages are obtained at the output of a rectifier RDR directly supplied by the alternating logic signals present at the contacts CLK and I/O. The rectifier RDR is preferably a full-wave rectifier, for example a simple bridge of four diodes that are connected as indicated in FIG. 4. A capacitor C may be parallel-connected to the output of the bridge, between VCCINT and VSSINT, to smoothen the voltage variations. This capacitor, however, may in certain cases be constituted simply by the values of parasitic capacitance that are necessarily present in the block B. This is all the truer as the signals clk and i/o vary at higher frequency.

When the signals clk and i/o are at opposite logic levels, for example one at 5 volts and the other at 0 volts, the rectifier RDR is in operation and sets up substantially 5 volts on VCCINT and 0 volts on VSSINT (if the voltage drop in the diodes of the rectifier is not taken into account). When clk and i/o are both at 5 volts, the rectifier is not in operation but tends to keep 5 volts on VCCINT. The potential VSSINT is floating but is kept substantially at the ground by the capacitor C. When clk and i/o are both at 0 volts, the opposite is the case: VSSINT is kept at 0 volts and VCCINT is floating.

The circuit will work properly only if the periods of time when clk and i/o are identical are not too lengthy. An increase in the capacitance value of the capacitor C makes it possible to extend these periods of time.

FIG. 5 also shows an improvement that can be used to reduce the risk of a malfunctioning in this case. The electronic circuits of the card are divided into two blocks B1 and B2 of which the block B1 has the specific feature of having only elements that do not require the permanent presence of a supply (namely circuits for the generation of internal pulses and various logic circuits). The block B2 brings together essentially circuits that cannot do without a DC supply (such as decoders, counters, state flip-flop circuits). These blocks are shown as being completely separated in FIG. 5, but there can obviously be connections between them.

The block B1 is directly supplied with the DC voltage VCCINT, VSSINT at output or the rectifier bridge RDR. The block B2 is supplied with a DC voltage VCCINT1, VSSINT1 obtained from the block B1, with insulation means that can be controlled to cut off the link between the rectifier and the block B2. These means include, for example a transistor T1 to break the connection between VCCINT and VCCINT1 and a transistor T2 to break the connection between VSSINT and VSSINT1. These transistors are activated by a signal ACTVCC, for the activation of the supply. The signal ACTVCC is prepared by the circuits of the card from the signals clk and i/o. It turns the transistors on or off depending on the relative state or these signals. For example, when clk and i/o are at distinct voltage levels, it turns them on, and when the oppposite is the case, it turns them off. The capacitor C is placed between VCCINT and VSSINT1. It is therefore possible to stop the operation of the block B1 and hence restrict the consumption of power by the card when the signals clk and i/o are such that the potential VCCINT or VSSINT become a floating potential. The period of time during which it is possible to have clk and i/o in the same state therefore increases.

A detailed explanation shall now be given of the method of communication between the card and its reader which enables the use or only the clock contact CLK and the data input/output contact I/O to carry out the main operations needed in the standard eight-contact memory cards.

To simplify the explanations, a general diagram of a memory card enabling the invention to be implemented is shown in FIG. 6. In this diagram, the rectifier RDR of FIGS. 4 and 5 is not shown.

The card has a memory MEM which is preferably a non-volatile EEPROM. This memory has binary information cells that can be addressed sequentially by means of a counter CPT. The counter can be incremented by an incrementation command INC. It can be reset in an initial position by a reinitialization command RESET. The memory cell designated by a determined position of the counter can be read by a read circuit AL controlled by a read command RD. It may be programmed in a logic 0 state (according to the conventional definition) by a programming circuit CPG activated by a signal PRG or erased (placed in the logic 1 state) by an erasure circuit CEF activated by a signal EFF.

If a programming or erasing voltage Vpp of more than 5 volts is needed for the operation of writing information elements in a memory cell of the card (for example 15 volts in general), this voltage will be generated by a voltage pull-up circuit ELV that is internal to the chip. A circuit of this kind is a standard one.

A general instruction decoder DEC1 receives the clock signals coming from the contact CLK and the data signals sent out by the card reader on the contact I/O. On the basis of these signals, it prepares the counter incrementation (INC), resetting (RESET) and read (RD) instructions as well as other instructions COMP0, COMP1 that shall be described further below. Furthermore, it prepares a write instruction WR. The card reader cannot use the clock signals on the contact CLK and the signals on the contact I/O to directly prepare a programming instruction at 0 that is different from the erasing instruction at 1. It prepares only one generic command: write (WR).

The card has an additional decoder DEC2 that prepares the command PRG or a command EFF during the reception of the signal WR depending on the state of the bit that is read immediately. As for the reader, it sends or does not send the signal WR, also as a function of the state of the bit that is read immediately before (at the same position).

The operation is therefore as follows: if the operating program of the reader determines that the cell has to be programmed at 0 (for example), then the cell is read (preparation of signals CLK and I/O capable of generating the internal instruction RD), and the information element read is transmitted to the reader. If the state of the cell is already 0, the reader sends no write command. The signal WR is not produced; there is neither programing nor erasure. If on the contrary the state read is 1, the reader sends a write command. At the same time, the decoder DEC2 receives the information read (cell at 1) and gives a signal PRG. The signal EFF could not be given by DEC2 unless the information read were 0.

The following figures show the different stages of the communications protocol according to the invention.

The reading (FIG. 7) starts with a routine step for the implementation of the counter CPT: while the clock signal sent out by the card reader to CLK is at a first level (1), the reader sets the contact I/O in a first state (1). Then the reader makes CLK go to a second logic level (0). The trailing transition on CLK triggers the incrementation command INC.

Hereinafter, the term logic level shall be used for CLK and the term logic state for I/O even though these terms have overlapping meanings, in order to distinguish the levels at CLK from the levels at I/O: the principle of the communications protocol according to the invention would not be changed if the logic level 1 on CLK were to correspond to a low potential while the logic state 1 on I/O were to be rather at a high potential. However, for particular reasons explained herebelow, it is the approach shown in the figures that is preferred. Similarly, the preparation of the logic signal ACTVCC mentioned with reference to FIG. 5 is clearly concerned by the real relative level of the potential.

After the routine incrementation, the reading stage continues as follows: with CLK being at the second level (0), the reader makes the contact I/O go into a state of high impedance, i.e. it sets no level on this contact. The read command RD is then sent out by the decoder DEC1. The state read in the cell is transmitted on the line I/O which can freely go either to 0 or to 1. The card reader, at the end of a specified period of time, still while CLK is at 0, detects the state assumed by the contact I/O representing the information stored in the read cell.

Finally, still while CLK is at 0, the reader preferably sets the contact I/O in a second state (state 0) with a view to subsequent operations such as writing.

FIG. 8 shows the part of the communications protocol pertaining to the writing operation. This step necessarily follows a read operation and starts while CLK is at 0 and I/O is set at 0 by the reader. The reader makes the contact CLK go to the first level (1). Then it sends out a full-wave transition on I/O: a rise to 1 and then a fall to 0. The pulse thus generated is short. It arises while CLK remains at 1 and is interpreted by the decoder DEC1 as a write command. The signal WR is sent out. It is received by the decoder DEC2 which interprets it as a function of the immediately preceding reading operation. A programming command or, on the contrary, an erasing command is sent out. The protocol does not allow two distinct write commands. It is the card that defines the meaning of the single command WR.

The programming or the erasure are operations that are lengthier than the reading operations. The signals PRG and EFF are therefore generated during the detection of the short pulse sent out on I/O but they then last as long as is necessary for the programming or the erasure of the cell to be completed. For this purpose, the reader sends out a square-wave pulse at the level 1 on CLK that is sufficiently long (in the range of several milliseconds, namely several tens or several hundreds of times longer than the square-wave pulse CLK=0 used for the reading operation).

In this respect, it is worthwhile to provide for the real potential level on CLK to be truly the opposite of the real level on I/O during this lengthy phase, in the circuits using the principle of FIG. 4 or 5, for the power supply then continues throughout the duration of the writing operation.

The writing stage normally ends with the rising of I/O to the state 1 and then the falling of CLK to the state 0. This is nothing else than a fresh incrementation. However it could also end with a fall of CLK before the rise of I/O for the performance of a reset instruction (RESET) or for an operation to place the system on standby (PWDWN) which shall be described further below.

The resetting phase is shown in FIG. 9. The passing of CLK to the second level (0) is followed by a rising of I/O to the first state (1), then CLK goes back to the first level (1). While CLK is at 1, a full-wave pulse from 1 to 0 and then from 0 to 1 is sent out by the reader on I/O. This full-wave pulse is detected by the decoder DEC1 and interpreted as a reset command. The signal RESET is sent out and resets the counter CPT.

In certain memory cards provided with security circuits, communication with the reader (or certain read or write operations) must be permitted only if a confidential code is entered by the user and verified by the card. However, the verification must be done within the card, without any output of the value of the confidential code from the card. For this purpose, two instructions that may be called COMP0 and COMP1 are commonly used. It shall be shown that these instructions can be transmitted to the card in the protocol according to the invention, in addition to the read, write, incrementation and reinitializing commands, despite the fact that the exchange uses only two contacts.

The instruction COMP0 means that the card must compare the state of a current cell (the state representing a bit of the confidential code) with the value 0. The instruction COMP1 indicates that the card must compare this state with the value 1.

The validation by the confidential code then consists in the succession of the following operations: the reader sends out a sequence of commands COMP0 and COMP1 as a function of a word of several bits, 0, 1, etc. At each time, the card increments the position of a cell (signal INC), makes an internal reading of the state of the cell (i.e. without using the instruction RD, or in any case without giving the result of the reading on I/O), compares this state with the value corresponding to the instruction in a comparator CMP and stores the result of the comparison in a register REG. When all the bits of the confidential code have been read, the results of the comparison should be all identical (the comparisons should be all right) if the code entered corresponds to the code stored. On the contrary, the register must contain indications of "false comparison" if the code entered is different from the code stored. A validation circuit VLD receiving the contents of the register REG gives a validation signal ENB in the former case or an inhibition signal INH in the latter case. The inhibition signal INH acts to prohibit either the writing or the reading or again any operation of the card. If necessary, it may be transmitted on the line I/O to inform the card reader. In any case, the confidential code stored in the memory does not come out on the contact I/O.

FIG. 10 shows the stage of preparation of the comparison instructions COMP0 and COMP1 in the twin-contact protocol according to the invention.

An incrementation is done: I/O goes to 1 and then CLK goes to 0.

While CLK remains at 0, the reader leaves I/O at 1 if it has to obtain the performance of COMP1. On the contrary, it sends out a short negative pulse (full-wave pulse of I/O from 1 to 0 and then from 0 to 1) if the instruction to be carried out is COMP0. Then, I/O remains at 1 and CLK rises again to 1 before I/O has fallen back to 0 (this is what distinguishes a read operation from a comparison operation). The decoder DEC1 interprets the presence or absence of the full-wave signal to prepare a command COMP0 or COMP1 intended for the comparator CMP. These commands activate the procedure of comparison and storage in the register REG.

Finally, FIG. 11 shows an additional possibility provided for in the protocol according to the invention. This is an instruction to place the system on standby (with reduced consumption). This instruction PWDWN is detected by the presence of a pulse on I/O (full-wave signal, positive then negative) while CLK=0. A subsequent incrementation stage shall be considered to be an instruction for returning the system to normal operation.

A description has thus been given of a twin-contact communications protocol (with clock and data input/output) enabling the same functions to be performed as standard chip card protocols. This protocol is clearly very advantageous for a twin-contact card but it can also be used with a chip card having more than two contacts if, for special reasons, it is desired to add other contacts (pertaining to other functions, different supplies, etc.). This protocol is also especially advantageous when the power supply has to be provided by these two contacts but it can also be used with supplies obtained by other means (such as electromagnetic transmission, additional contacts reserved for the supply, batteries, etc.).

We claim:

1. Chip carrier of the type enabling a reciprocal exchange of information elements between the chip carrier and a reader into which the chip carrier is inserted, wherein:

the chip carrier comprises only two contacts, flush with the surface, through which there pass electrical signals representing the information elements of the reciprocal exchange, one of the contacts being a clock contact and the other contact being a data input/output contact, and wherein the chip carrier further comprises a rectifier circuit having inputs connected to the two contacts and outputs providing the rest of the chip carrier with a rectified voltage necessary for supplying the chip carrier with power.

2. Chip carrier according to claim 1, wherein the rectifier is a full-wave rectifier.

3. Chip carrier according to claim 2, wherein the rectifier has a bridge of diodes and a smoothing capacitor.

4. Chip carrier of the type enabling a reciprocal exchange of information elements between the chip carrier and a reader into which the chip carrier is inserted, wherein:

the chip carrier comprises only two contacts, flush with the surface, through which there pass electrical signals representing the information elements of the reciprocal exchange, and wherein the chip carrier further comprises a rectifier circuit having inputs connected to the two contacts and outputs providing the rest of the chip carrier with a rectified voltage necessary for supplying the chip carrier with power, and wherein electronic circuits of the chip carrier comprise a first part supplied directly by the voltage coming from the rectifier and a second part supplied by the rectifier by means of controllable insulation means, to interrupt the link between the rectifier and the second part when the levels of voltage on the two contacts are identical and to restore it when they are different.

5. Chip carrier of the type enabling a reciprocal exchange of information elements between the chip carrier and a reader into which the chip carrier is inserted, wherein:

the chip carrier comprises only two contacts, flush with the surface, through which there pass electrical signals representing the information elements of the reciprocal exchange, and wherein the chip carrier further comprises a rectifier circuit having inputs connected to the two contacts and outputs providing the rest of the chip carrier with a rectified voltage necessary for supplying the chip carrier with power, and wherein a first contact is a clock contact whose leading edges and trailing edges determine the instant of each operation to be performed by the chip carrier, and the second contact is a data input/output contact whose logic level represents firstly the instructions to be performed by the chip carrier under the control of the reader and, secondly, the information elements coming from the chip carrier and intended for the reader.

6. Chip carrier of the type enabling a reciprocal exchange of information elements between the chip carrier and a reader into which the chip carrier is inserted, the chip carrier having only two contacts to carry out the reciprocal exchange of information elements, the first contact being a clock contact whose leading edges and trailing edges determine the instant of each operation to be performed by the chip carrier, and the second contact being a data input/output contact whose logic level represents firstly the instructions to be performed by the chip carrier under the control of the reader and, secondly, the information elements coming from the chip carrier and intended for the reader.

7. Chip carrier according to claim 6, further comprising a first decoder to set up internal control signals as a function of the signals enforced by the reader on the two contacts, among them a write command signal for writing in a memory cell, and a second decoder receiving the write command signal and furthermore receiving a signal representing an information bit read in the cell just before the write instruction, the second decoder preparing a signal for the programming or erasure of the cell at the reception of the write signal, depending on whether the state read in the cell is erased or programmed.

8. Method of communication between a chip carrier and a carrier reader by means of a clock contact CLK controlled by the reader and a data input/output contact I/O, characterized in that:

a) the writing of an information bit in a memory cell of the carrier is done immediately after an operation for reading the state of this bit;

b) a write command is given by the reader by means of the contacts CLK and I/O only if the bit read is the logic reverse of the bit to be written, the write command being given in a form that is independent of the value of the bit to be written;

c) when there is a write command received from the reader, the carrier carries out a programming or erasing operation as a function of the value of the bit read.

9. Method according to claim 8, characterized in that the reading of the state of a bit takes place according to the following protocol, the different phases taking place in the order indicated: the setting of the contact I/O by the reader in a first state, while the contact CLK is at a first level; a first changing of the level of CLK; the release of the potential of the contact I/O by the reader; the setting, by the carrier, of the contact in a state corresponding to the information element to be transmitted; the reading of the logic state of the contact I/O by the reader before a second change in the level of CLK to its first level.

10. Method according to claim 9, characterized in that the reader preferably sets the contact I/O in a second state, after the reading and before the second changing of the level of CLK.

11. Method according to claim 9, characterized in that the writing is done according to the following protocol: while CLK is at its first level, after a read operation, a short pulse is given by the reader on the contact I/O, making this contact go to the first state and bringing it back to the second state; the writing is done after this short pulse while the contact I/O remains set in the second state and on condition that CLK remains in the first state.

12. Method according to claim 9, characterized in that an operation to increment the position of a memory cell to be read or to be written in is carried out during the first part of a read operation, namely during the passing of CLK to the second level after the setting of I/O in the first state.

13. Method according to claim 9, wherein an operation for the internal comparison of the state of a memory cell with a determined bit can be done by the carrier without the application of this state to the contacts, characterized in that the signals sent out by the reader to give a comparison instruction include the passing of the contact I/O from the second state to the first state, followed by the passing of CLK from the first level to the second level, followed by the presence or absence of a full-wave transition on the contact I/O according to the comparison instruction to be carried out, followed by the passing of CLK to the first level and finally followed by the passing of I/O to the second state.

14. Method according to claim 9, characterized in that it comprises a step for the reinitialization of a memory cell position counter (CPT), this step being activated by the succession of the following signals sent out by the carrier reader: the passing of CLK from the first level to the second level, followed by the passing of the contact I/O from the second state to the first state, followed by the passing of CLK to the first level and followed finally by a full-wave transition of a state on the contact I/O.

15. Method of communicating between a chip carrier and a reader comprising the steps of:

providing only two contacts between the chip carrier and the reader, one of the contacts being a clock contact and the other of the contacts being a data input/output contact;

reading a current logical state of a bit;

transmitting the current logical state of the bit from the chip carrier to the reader via the data input/output contact;

ascertaining that the current logical state of the bit must change, and in response to the ascertaining step, transmitting a write command from the reader to the chip carrier via the data input/output contact and the clock contact, the write command being given in a form that is independent of a next logical state of the bit; and changing the current logical state of the bit to the next logical state of the bit, the changing step being performed as a function of the current logical state of the bit and in response to the write command transmitting step.

16. Method according to claim 15, wherein the step of transmitting the current logical state of the bit further comprises the steps of:

setting the data input/output contact to a first I/O state, the clock contact being at a first clock state when the data input/output contact is set to the first I/O state;

changing the clock contact from the first clock state to a second clock state;

releasing control of the data input/output contact, the releasing step being performed by the reader;

setting the data input/output contact to a state corresponding to the current logical state of the bit, the current logical state setting step being performed by the chip carrier; and reading the state of the data input/output contact, the contact reading step being performed by the reader.

17. Method according to claim 15, wherein the step of transmitting the write command further comprises the step of transmitting a short pulse across the data input/output contact, the short pulse being transmitted by the reader, the short pulse being transmitted after the clock contact has been changed from the second clock state back to the first clock state, the short pulse being transmitted while the clock contact is at the first contact state, and the short pulse causing the data input/output contact to change from the first I/O state to a second I/O state and then back to the first I/O state, and wherein the step of changing the current logical state of the bit is performed after the short pulse is transmitted and while the data input/output contact is in the second I/O state and on condition that the clock contact remains in the first clock state.

18. Method according to claim 15, further comprising the step of internally comparing the current state of the logical bit with a determined bit, the comparing step being performed by the chip carrier.

19. Method according to claim 15, further comprising the steps of interrupting a link between first and second sections of the chip carrier when a state of the clock contact is the same as a state of the data input\output contact; and restoring the link between the first and second sections of the chip carrier when a state of the clock contact is different than a state of the data input\output contact.

20. Method according to claim 15, further comprising the step of providing the chip carrier with a first decoder and a second decoder, the first decoder performing the transmitting step and the second decoder performing the changing step.

* * * * *